United States Patent
Buganza et al.

(10) Patent No.: US 8,312,760 B2
(45) Date of Patent: Nov. 20, 2012

(54) KNOCK DETECTION DEVICE FOR A COBUSTION ENGINE AND A METHOD FOR A COMBUSTION KNOCK DETECTION

(75) Inventors: Federico Buganza, Nonantola (IT); Carsten Kluth, Stuttgart (DE); Oskar Torno, Schwieberdingen (DE); Werner Haeming, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 624 days.

(21) Appl. No.: 12/436,541

(22) Filed: May 6, 2009

(65) Prior Publication Data
US 2009/0288476 A1 Nov. 26, 2009

(30) Foreign Application Priority Data

May 7, 2008 (EP) .................................... 08103844

(51) Int. Cl.
*G01L 23/22* (2006.01)
(52) U.S. Cl. ...................................... 73/35.05; 73/35.01
(58) Field of Classification Search ........ 73/35.01–35.13; 123/406.37–406.39; 701/111
See application file for complete search history.

(56) References Cited

U.S. PATENT DOCUMENTS

| | | | |
|---|---|---|---|
| 4,153,020 A | | 5/1979 | King et al. |
| 4,312,214 A | * | 1/1982 | Kramer et al. ............... 73/35.05 |
| 4,463,722 A | * | 8/1984 | Kobayashi ................... 73/35.05 |
| 4,478,068 A | * | 10/1984 | Bonitz et al. ................. 73/35.04 |
| 4,887,456 A | * | 12/1989 | Cockerham et al. ......... 73/35.05 |
| 4,945,876 A | | 8/1990 | Nakaniwa |
| 5,040,510 A | | 8/1991 | Krebs et al. |
| 5,205,258 A | | 4/1993 | Hashimoto et al. |
| 5,230,316 A | * | 7/1993 | Ichihara et al. .......... 123/406.38 |
| 5,386,367 A | | 1/1995 | Ziegler et al. |
| 6,392,584 B1 | | 5/2002 | Eklund |
| 6,529,817 B2 | | 3/2003 | Torno et al. |
| 6,947,828 B2 | * | 9/2005 | Fujiwara et al. ............... 701/111 |
| 2010/0106392 A1 | * | 4/2010 | Charrier et al. ............... 701/111 |
| 2011/0030452 A1 | * | 2/2011 | Dierssen et al. ............. 73/35.01 |

FOREIGN PATENT DOCUMENTS

| | | |
|---|---|---|
| DE | 102 20 600 | 12/2003 |
| FR | 2555664 | * 5/1985 |
| JP | 64-45966 | * 2/1989 |

* cited by examiner

*Primary Examiner* — Burton Mullins
(74) *Attorney, Agent, or Firm* — Kenyon & Kenyon LLP

(57) ABSTRACT

In the field of knock detection in a combustion engine, a method and a device detects and controls the knock by adapting the gain of an amplifier which amplifies the knock sensor signal. The gain of the amplifier is adapted based on analysis of a set of samples from the knock sensor so that the amplification of the knock sensor signal across the entire measuring window is optimum and the complete ADC evaluation range can be utilized better.

10 Claims, 1 Drawing Sheet

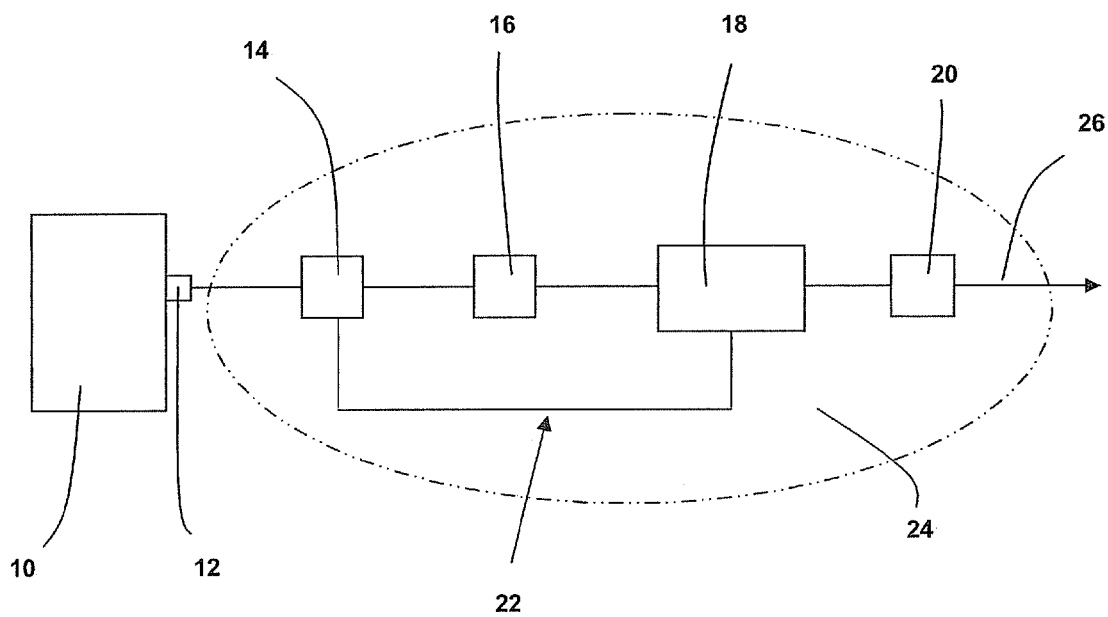

KNOCK DETECTION DEVICE FOR A COBUSTION ENGINE AND A METHOD FOR A COMBUSTION KNOCK DETECTION

CROSS-REFERENCE TO RELATED APPLICATIONS

The present application claims priority to Application No. 08103844.0, filed in the European Patent Office on May 7, 2008, which is expressly incorporated herein in its entirety by reference thereto.

FIELD OF THE INVENTION

The present invention relates to the field of knock detection in combustion engines.

BACKGROUND INFORMATION

U.S. Pat. No. 6,529,817 describes a device for detecting a knock in a combustion engine.

Conventionally, the amplifier used for amplifying the knock sensor signal has a fixed gain. As the knock sensor amplitude varies over a wide range, the amplification of the signal with a fixed gain will result in loss of resolution under some conditions.

German Patent Document No. 102 20 600 describes a device in which the gain of the amplifier is adapted after processing the knock signal for knock detection.

U.S. Pat. No. 5,040,510 describes a method in which the gain of the amplifier is stored as a function of engine RPM and adapted accordingly.

SUMMARY

The device and method according to example embodiments of the present invention have the below-mentioned aspects and advantages.

The gain of the amplifier which amplifies the signal from the knock sensor is adapted based on the analysis of plurality of samples from a knock sensor. As the amplitude of the knock sensor signal varies over a wide range, adapting the amplifier gain based on an analysis of a plurality of samples will enable the amplifier to operate in full range, resulting in better accuracy of the knock signal and hence a better control of knock.

The gain of the amplifier is adapted using different criteria like a single sample crossing the set threshold, a pre-set number of samples crossing the threshold or the average of the samples crossing the set threshold. Using a single sample crossing the set threshold to adapt the gain may be faster, but there may be a risk that the single sample may be a spurious one and may not reflect the actual condition. Using a preset number of samples crossing the set threshold to adapt the gain may be closer to realistic condition but may need more computations and time. Using an average value of the samples crossing the set threshold to adapt the gain may be a compromise of the other two solutions but may not reflect the actual conditions when the amplitude of the knock signal varies to a large extent. Based on the engine operating conditions different criteria can be used for knock control.

The gain of the amplifier is adapted based on analysis of a set of samples from the knock sensor such that the amplification of the knock sensor signal across the entire measuring window is optimum and the complete ADC evaluation range can be utilized better.

According to example embodiments of the present invention, a knock detection device for a combustion engine includes: an amplifier having a variable gain adapted to amplify an analog signal from a knock sensor; an analog-to-digital converter adapted to receive the amplified signal from the amplifier and convert the received signal to a digital; a signal evaluation device adapted to analyze the digital samples to control the gain of the amplifier; and a knock detection device adapted to analyze the digital samples to detect a knock in the combustion engine.

The gain of the amplifier may be adapted from analysis of digital samples received directly from the analog-to-digital converter.

The signal evaluation device may include a digital signal evaluation device.

The signal evaluation device may be adapted to use different methods of evaluation, including at least one of (a) an evaluation of amplitudes, (b) an evaluation of energy, and (c) a standard deviation.

The signal evaluation device may be adapted to use two gain thresholds, including an upper threshold and a lower threshold, to adapt the gain of the amplifier whenever the digital samples are above the upper threshold or below the lower threshold.

The gain of the amplifier may be reducible when the digital samples are above the upper threshold, and the gain of the amplifier may be increasable when the digital samples are below the lower threshold.

The gain of the amplifier may be adapted when a digital sample having a maximum value, among a plurality of digital samples, is either above the upper threshold or below the lower threshold.

The gain of the amplifier may be adapted when a predefined number of digital samples are either above the upper threshold or below the lower threshold.

The gain of the amplifier may be adapted when an average value of the digital samples is either above the upper threshold or below the lower threshold.

The gain of the amplifier may be chosen such that the amplified signal delivered to the ADC covers a full range of the ADC.

According to example embodiments of the present invention, a method for knock detection includes: receiving a knock sensor signal in analog form; converting the knock sensor signal from analog form to digital samples; analyzing the digital samples; based on the analysis of the digital samples, adapting a gain of an amplifier for a next cycle of combustion; and evaluating the digital samples to find whether a knock occurred or not in the combustion engine.

BRIEF DESCRIPTIONS OF THE DRAWING

FIG. 1 is a schematic view of a pilot ECU along with the combustion engine.

DETAILED DESCRIPTION

FIG. 1 is a schematic view of a knock detection device.

Knocking in a spark-ignition internal combustion engines occurs when combustion of the air/fuel mixture in the cylinder starts off correctly in a response to ignition by the spark plug, but one or more pockets of air/fuel mixture explode outside the envelope of the normal combustion front. The fuel-air charge is meant only to be ignited by the spark plug, and at a precise time in the piston's stroke cycle. When knock occurs, two or more combustion fronts will exist and their collisions produce a sudden rise in cylinder pressure and a shock-wave which will reverberate around the cylinder. This might damage the cylinder.

Shown in FIG. 1 are a combustion cylinder 10, a knock sensor 12 fixed to the walls of the combustion cylinder 10 and a knock detection device 24 which receives the signal from the knock sensor and provides a knock control signal 26.

The knock detection device includes a connection to the knock sensor, an amplifier 14 which receives the signal from the knock sensor, an analogue to digital converter (ADC) 16 which receives amplified signal from the amplifier 14 and a signal evaluation device 18 which receives the digital signal from the ADC 16. A feedback path is provided from the signal evaluation device 18 to the amplifier 14 through a connection 22. The output of the signal evaluation device 18 is provided to the knock detection device 20. The output of the knock detection device 20 is a knock control signal 26.

When a knock occurs in the cylinder 10, the knock sensor 12 picks up the vibrations from the cylinder 10 and provides this signal to the amplifier 14. The amplitude of the knock signal varies strongly under different conditions. Under the full load and maximum speed of the engine, the knock signal amplitude can be as large as 40 times the amplitude of the knock signal under idle condition. To maintain a good resolution and accuracy for the knock signal over a wide range, the amplifier 14 is provided with a variable gain.

The amplifier 14 amplifies the knock sensor signal and provides the amplified stream to the ADC 16. The ADC 16 converts the analogue signal to digital signals which are a set of digital samples. The digital samples are provided to the signal evaluation device 18.

The signal evaluation device 18 analyses the digital samples for adapting the gain of the amplifier 14.

For adapting the gain of the amplifier, the signal evaluation device 18 uses criteria like average value or peak value. The average value is the average value of all the digital samples analyzed and if the average value crosses a set threshold, the signal evaluation device 18 provides the gain information to the amplifier 14 through the feedback path 22. Also a peak value from a single digital sample can be used to adapt the gain of the amplifier 14. Alternatively to avoid a sporadic peak signal from a single digital sample causing the change in gain of the amplifier 14, a criteria can be used where a pre-set number of digital samples crossing the set threshold will need a new gain for the amplifier 14.

The threshold consists of two levels, upper threshold and lower threshold. When the peak value has exceeded the upper threshold or a set number of samples have exceeded the upper threshold, then the gain of the amplifier 14 is reduced. When the lower threshold is fallen short of, then the gain of the amplifier 14 is increased. The reduction in the gain or increase in the gain of the amplifier 14 is done through the feed-back path 22.

Now the amplification of the knock sensor signal across the entire measuring window is optimum so that the complete ADC evaluation range can be utilized better.

For adapting the gain of the amplifier 14, the signal evaluation device 18 uses different methods of evaluation like, evaluation of the amplitudes as explained above or an evaluation of energy or a standard deviation or a combination of these.

To detect whether knock occurred or not in the combustion cylinder, the knock detection device 20 analyses the digital samples which may involve discrete Fourier transforms or fast Fourier transform analysis of the samples. The analysis methods allow an analysis of several frequency ranges and a suppression of the interference frequencies. Analysis will generate one or more knock indicators for combustion event. Knocking is detected when one or more of these knock indicators exceed certain predetermined and adjustable thresholds values. A reference value for knock free operation is also considered during the comparison. One such reference value is always obtained by the same signal evaluation device when the knock free operation is occurring.

Also alternatively the signal evaluation device can use energy analysis process. This process involves filtering the digital samples, rectifying the filtered digital samples and then integrating the rectified digital samples to obtain knock indices. Knocking is detected when one or more of these knock indicators exceed certain predetermined and adjustable thresholds values.

What is claimed is:

1. A knock detection device for a combustion engine, comprising:
   an amplifier having a variable gain adapted to amplify an analog signal from a knock sensor;
   an analog-to-digital converter adapted to receive the amplified signal from the amplifier and convert the received amplified signal into to digital samples;
   a signal evaluation device adapted to receive the digital samples directly from the analog-to-digital converter and analyze the digital samples to control the gain of the amplifier by adapting the gain based on the analysis of the directly received digital samples; and
   a knock detection device adapted to analyze the digital samples to detect a knock in the combustion engine.

2. The knock detection device according to claim 1, wherein the signal evaluation device includes a digital signal evaluation device.

3. The knock detection device according to claim 1, wherein the signal evaluation device is adapted to use different methods of evaluation, including at least one of (a) an evaluation of amplitudes, (b) an evaluation of energy, the evaluation of energy including filtering of the digital samples, rectification of the filtered digital samples, and integration of the rectified digital samples to produce knock indices, which are compared to predetermined thresholds to detect the presence of knocking and (c) a standard deviation.

4. The knock detection device according to claim 1, wherein the gain of the amplifier is chosen such that the amplified signal delivered to the analog-to-digital converter covers a full evaluation range of the analog-to-digital converter.

5. A knock detection device for a combustion engine, comprising:
   an amplifier having a variable gain adapted to amplify an analog signal from a knock sensor;
   an analog-to-digital converter adapted to receive the amplified signal from the amplifier and convert the received amplified signal into digital samples;
   a signal evaluation device adapted to analyze the digital samples to control the gain of the amplifier; and
   a knock detection device adapted to analyze the digital samples to detect a knock in the combustion engine,
   wherein the signal evaluation device is adapted to use two gain thresholds, including an upper threshold and a lower threshold, to adapt the gain of the amplifier whenever the digital samples are above the upper threshold or below the lower threshold.

6. The knock detection device according to claim 5, wherein the gain of the amplifier is reducible when the digital samples are above the upper threshold and the gain of the amplifier is increasable when the digital samples are below the lower threshold.

7. The knock detection device according to claim 5, wherein the gain of the amplifier is adapted when a digital sample having a maximum value, among a plurality of digital samples, is either above the upper threshold or below the lower threshold.

8. The knock detection device according to claim 5, wherein the gain of the amplifier is adapted when a predefined number of digital samples are either above the upper threshold or below the lower threshold.

9. The knock detection device according to claim 5, wherein the gain of the amplifier is adapted when an average value of the digital samples is either above the upper threshold or below the lower threshold.

10. A method for knock detection, comprising:
receiving a knock sensor signal in analog form;
converting the received knock sensor signal from analog form into digital samples;
analyzing the digital samples;
based on the analysis of the digital samples, adapting a gain of an amplifier for a next cycle of combustion; and
evaluating the digital samples to find whether a knock occurred or not in the combustion engine.

* * * * *